June 2, 1970  S. L. EDWARDS  3,515,232
ROCKET DRIVEN VEHICLE TRANSMISSION
Filed May 5, 1967
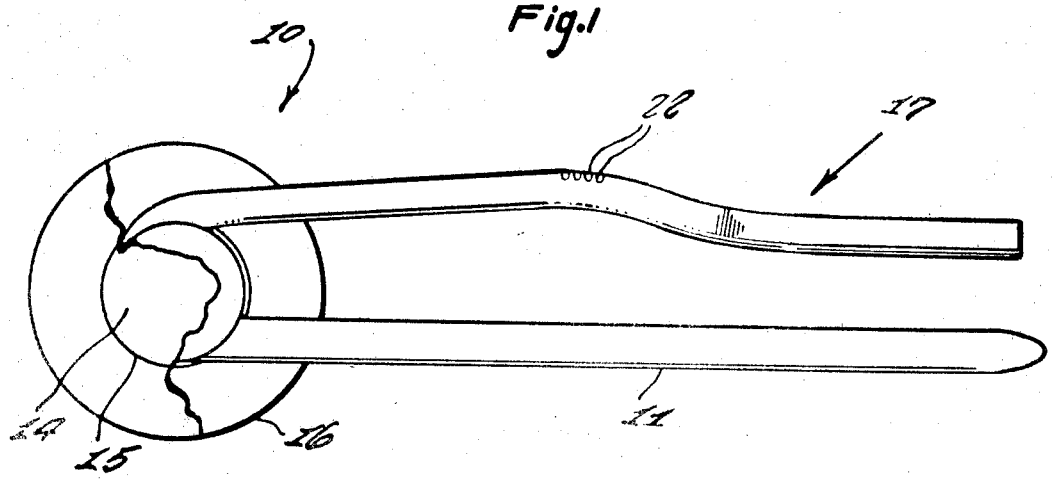
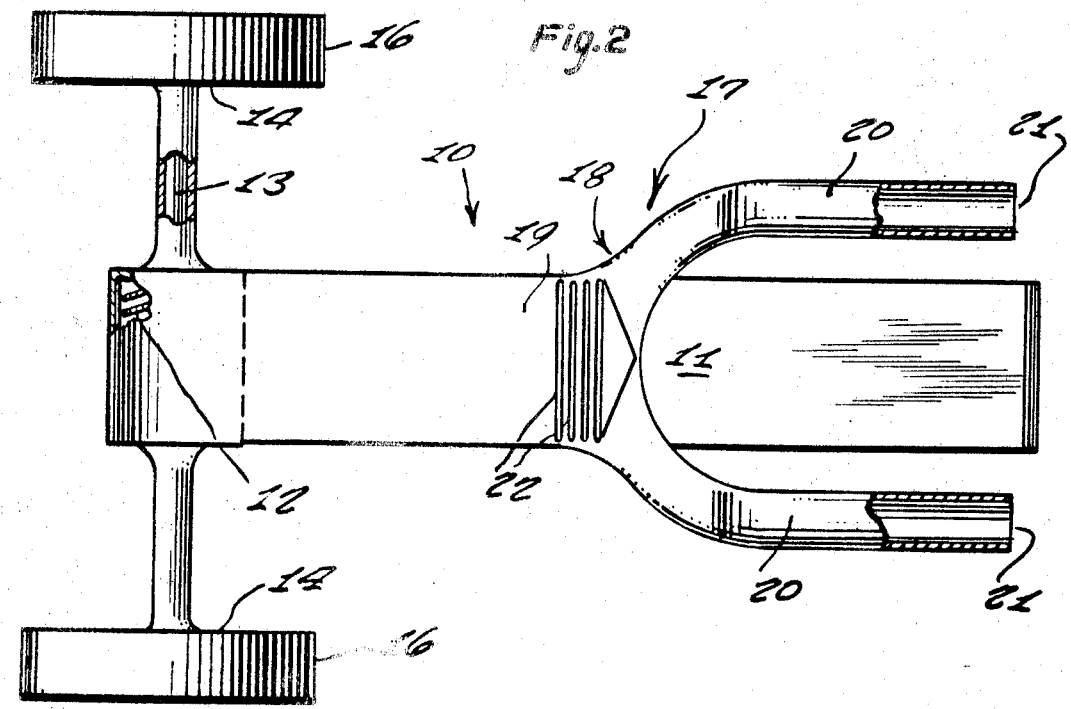
INVENTOR.
Samuel L. Edwards

# United States Patent Office 3,515,232
Patented June 2, 1970

3,515,232
ROCKET DRIVEN VEHICLE TRANSMISSION
Samuel L. Edwards, 177 Hillside Ave.,
Newark, N.J. 07108
Filed May 5, 1967, Ser. No. 636,492
Int. Cl. B62b 57/04
U.S. Cl. 180—7
1 Claim

ABSTRACT OF THE DISCLOSURE

A transmission for automotive vehicles incorporating the components, systematic operational procedure and arrangements used in rocketry for producing a driving force for the automotive vehicle.

This invention relates generally to automotive vehicle transmissions.

A principal object of the present invention is to provide an automotive vehicle transmission which is different in construction from a motor vehicle incorporating a gasoline engine or gas turbine, and which includes the components, systematic operational procedure and arrangements utilized by solid fuel rockets or liquid fuel rockets utilizing the thrust of the rocket for producing energy and power with its internal explosive action for operating the vehicle.

Another object of the present invention is to provide a rocket driven vehicle transmission wherein the distribution of the rocket's energy force are controlled by manual manipulation and is speeded up by an accelerator.

Yet another object of the present invention is to provide a rocket driven vehicle transmission which would incorporate rocketry technology.

Other objects of the present invention are to provide a rocker driven vehicle transmission which is simple in design, relatively inexpensive, rugged in construction, easy to use and efficient in operation.

These and other objects will be readily evident upon a study of the following specification and the accompanying drawing wherein:

FIG. 1 is a side elevation view of the present invention shown partly broken away, and FIG. 2 is a top plan view thereof shown partly in cross-section to show the internal construction thereof.

Referring now to the drawing in detail, the reference numeral 10 represents a rocket driven vehicle transmission, according to the present invention wherein there is a rocket engine 11 the purpose of which is to provide power to fans 12 which in turn provide a driving force upon an axle 13 to which they are secured. The driving force is then applied by the axle to wheel cylinders 14 which are secured to the respective ends thereof as shown in FIG. 2.

Upon each of the wheel cylinders 14, there is a wheel rim 15 upon which there is mounted a tire 16.

The present device further includes an exhaust system 17 which incorporates a bifurcated unit 18 including a housing 19 and a pair of rearwardly extending tubes 20 which are open at their terminal ends as shown at 21. The tubes 20 are equidistant on each side from the longitudinal center of the device so as to provide equalized thrust force forwardly. The housing 19 has a plurality of louvers 22 on the upper side thereof so as to filter out the fumes from exhaust gases that enter the tubes 20, as shown, the exhaust gases being lighter will rise upwardly to filter out of the louvers. The exhaust gases within the tubes 20 are relatively hot and may accordingly be regulated by other devices.

In operative use the rocket engine 11 develops power for driving the fans 12 which in turn drive the axles 13 so as to transmit motion to the wheels 14 and the tires 16 mounted upon the rims 15 thereof. The movement of gases from the engine 11, around the fans 12 and then into the exhaust system 17 assume a generally U-shaped configuration wherein the gas first moves forwardly then around the fans after which it moves rearwardly through the exhaust system where it moves outwardly therefrom through the bifurcated tubes 20.

I claim:

1. In a rocket driven vehicle transmission, the combination of a rocket engine, said engine providing a means for developing gasses under presure, said gasses driving a plurality of blades secured on an axle, said blades being part of a fluid motor assembly, and said axle having a wheel secured thereto at each end thereof, each said wheel having a rim upon which a tire is mounted, said transmission including an exhaust system, said exhaust system incorporating a housing, said housing being bifurcated at its rear end, said bifurcated end comprising a pair of rearwardly extending tubes, each of said tubes being open at its rear end, and said housing having a plurality of louvered openings upon the upper side thereof for eliminating fumes outwardly from said exhaust gas moving through said housing, said engine comprising a generally horizontally extending member which extends rearwardly of said blades, said exhaust assembly comprising a unit located in spaced apart relation above said rocket engine, said blades and said exhaust assembly providing a generally U-shaped course for gasses developed by said rocket engine to drive said wheels, and said vehicle having said wheels only at a forward end thereof with said engine and exhaust system trailing rearwardly thereof.

References Cited

UNITED STATES PATENTS

| 2,939,279 | 6/1960 | Highberg | 181—60 X |
| 3,073,114 | 1/1963 | Wood | 60—39.47 X |
| 3,079,126 | 2/1963 | Pohl | 253—1 |
| 3,101,592 | 8/1963 | Robertson et al. | 60—39.46 |
| 3,282,047 | 11/1966 | Wertheimer | 60—30 |

FOREIGN PATENTS

| 167,472 | 1/1951 | Austria. |
| 935,705 | 2/1948 | France. |
| 4,578 | 1906 | Great Britain. |

OTHER REFERENCES

Popular Science (vol. 176, No. 1), January 1960, p. 130 [181-36.4].

Air Force Manual (AFM 52-31), Sept. 20, 1957, "Guided Missiles," p. 53.

LEO FRIAGLIA, Primary Examiner

U.S. Cl. X.R.

180—66; 181—60; 253—1